United States Patent
Schindler et al.

(10) Patent No.: US 7,262,984 B2
(45) Date of Patent: Aug. 28, 2007

(54) METHOD AND APPARATUS FOR STORING AND READING INFORMATION IN A FERROELECTRIC MATERIAL

(76) Inventors: Günther Schindler, Ungererstr. 19, München (DE) 80802; Markus Vogel, Heimgartenstr. 4, Puchheim (DE) 82178; Christian Erich Zybill, Am Michaelianger 2d, Oberschleissheim (DE) 85764

( * ) Notice: Subject to any disclaimer, the term of this patent is extended or adjusted under 35 U.S.C. 154(b) by 184 days.

(21) Appl. No.: 11/034,219

(22) Filed: Jan. 13, 2005

(65) Prior Publication Data
US 2005/0195631 A1 Sep. 8, 2005

Related U.S. Application Data

(63) Continuation of application No. PCT/EP03/07650, filed on Jul. 15, 2003.

(51) Int. Cl.
*G11C 11/22* (2006.01)
(52) U.S. Cl. .................. 365/145; 365/164; 396/126; 396/110
(58) Field of Classification Search ............... 365/145, 365/164; 396/126, 110
See application file for complete search history.

(56) References Cited

U.S. PATENT DOCUMENTS

| | | | |
|---|---|---|---|
| 5,481,527 A | 1/1996 | Kasanuki et al. | |
| 5,777,977 A * | 7/1998 | Fujiwara et al. | 369/126 |
| 5,835,477 A | 11/1998 | Binnig et al. | |
| 5,946,284 A | 8/1999 | Chung et al. | |
| 5,985,404 A * | 11/1999 | Yano et al. | 428/846.1 |
| 6,064,587 A | 5/2000 | Jo | |
| 6,477,132 B1 * | 11/2002 | Azuma et al. | 369/126 |
| 6,756,236 B2 * | 6/2004 | Ford et al. | 438/3 |

FOREIGN PATENT DOCUMENTS

DE 4018308 A1 12/1991

OTHER PUBLICATIONS

C. H. Ahn et al. "Local, Nonvolatile Electronic Writing of Epitaxial $Pb(Zr_{0.52}Ti_{0.48})O_3/SrRu_{o3}$Heterostructures," Science, vol. 276, May 16, 1997, pp. 1100-1103.

(Continued)

*Primary Examiner*—Richard T. Elms
*Assistant Examiner*—Toan Le
(74) *Attorney, Agent, or Firm*—Dicke, Billig & Czaja PLLP

(57) ABSTRACT

To store information in a ferroelectric material, a sample probe is used to bring about mechanical action on individual domains and thereby to cause a reversal of polarization in the individual domains, with electrodes situated below the ferroelectric material being able to have a bias applied to them to stabilize the change/reversal of polarization. The reversal of polarization causes an alteration in the surface topography of the ferroelectric material, and this alteration can be used to read the information. The stored information is therefore obtained by ascertaining the surface topography of the ferroelectric material. The information is written and read using an AFM tip, with the tip being able to be operated in contact or tapping mode for the purpose of writing, and additionally in noncontact mode for the purpose of reading.

21 Claims, 3 Drawing Sheets

OTHER PUBLICATIONS

Dragan Damjanovic. "Piezoelectric Properties of Perovskite Ferroelectrics: Unsolved Problems and Future Research," Ann. Chim. Scie. Mat., 2001, No. 26, pp. 99-106.

C. Durkan et al. "Probing Domains at the Nanometer Scale in Piezoelectric Thin Films," Physical Review B, vol. 60, No. 23, Dec. 15, 1999, pp. 16198-16204.

Khalil El-Hami et al. "The Use of Nanotechnology to Fabricate Ultra-High Density Molecular Memory in P(VDF/TRFE) Copolymer: Data Storage," Ann. Chim. Sci. Mat., 2001, No. 26, pp. 217-220.

C. S. Ganpule et al. "Scaling of Ferroelectric and Piezoelectric Properties in Pt/SrBi$_2$Ta$_2$O$_9$/Pt Thin Films," Applied Physics Letters, vol. 75, No. 24, Dec. 13, 1999, pp. 3874-3876.

Alexei Gruverman et al. "Characterization and Control of Domain Structure in SrBi$_2$Ta$_2$O$_9$ Thin Films by Scanning Force Microscopy," Jpn. J. Appl. Phys., 1998, vol. 37, pp. L939-L941.

A. Gruverman et al. "Nanoscopic Switching Behavior of Epitaxial SrBi$_2$Ta$_2$O$_9$ Films Deposited by Pulsed Laser Deposition," Applied Physics Letters, Jan. 3, 2000, vol. 76, No. 1, pp. 106-108.

G. D. Hu et al. "Domain Imaging and Local Piezoelectric Properties of the (200)-Predominant SrBi$_2$Ta$_2$O$_9$ Thin Film," Applied Physics Letters, Sep. 13, 1999, vol. 75, No. 11, pp. 1610-1612.

Q. D. Jiang et al. "Nucleation and Surface Morphology Evolution of Ferroelectric SrBi$_2$Ta$_2$O$_9$ Films Studied by Atomic Force Microscopy," Surface Science 405, (1998), pp. L554-L560.

Lukas M. Eng. "Nanoscale Domain Engineering and Characterization of Ferroelectric Domains," Nanotechnology 10, (1999), pp. 405-411.

A. E. Romanov et al. "Domain Patterns in (111) Oriented Tetragonal Ferroelectric Films," Phys. Stat. Sol. 172, (1999), pp. 225-253.

Hyunjung Shin et al. "Read/write Mechanisms and Data Storage System Using Atomic Force Microscopy and MEMS Technology," Ultramicroscopy 91, (2002), pp. 103-110.

Christian Erich Zybill. "The Mechanism of Polarisation Inscription into Ferroelectric (111) PZT and (100) SBT Films," Materials Science and Engineering C 18, (2001), pp. 191-198.

Christian Erich Zybill et al. Substrate Influence on the Domain Structure of (111) PZT PbTi$_{0.75}$Zr$_{0.75}$O$_3$ Films.

S. Mathews et al. "Ferroelectric Field Effect Transistor Based on Epitaxial Perovskite Heterostructures," Science, vol. 276, Apr. 11, 1997, pp. 238-240.

R. Bruchhaus et al. "Integrated Ferroelectrics," 14, (1997), pp. 141.

* cited by examiner

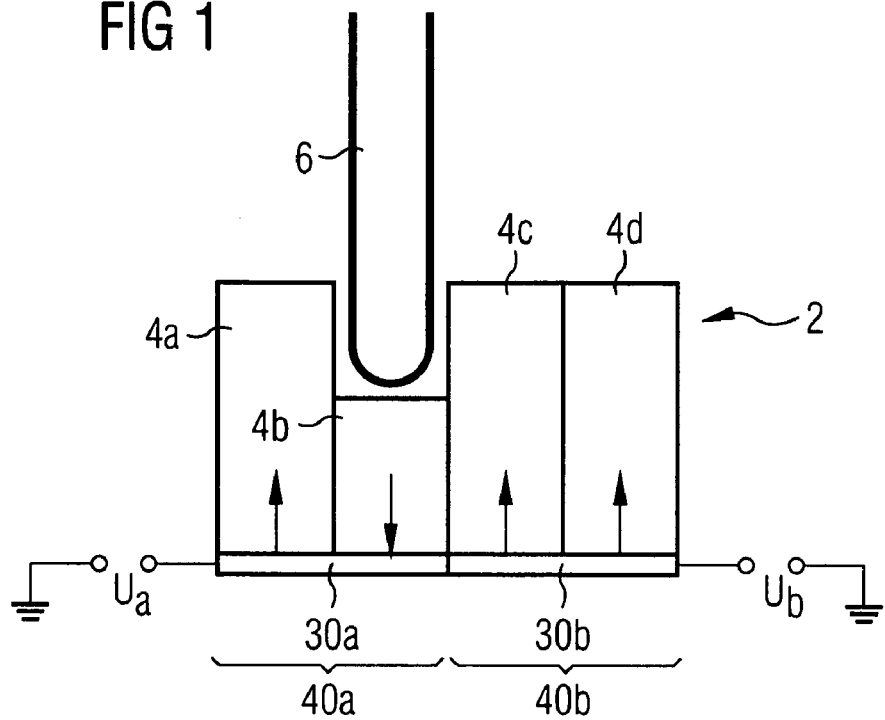
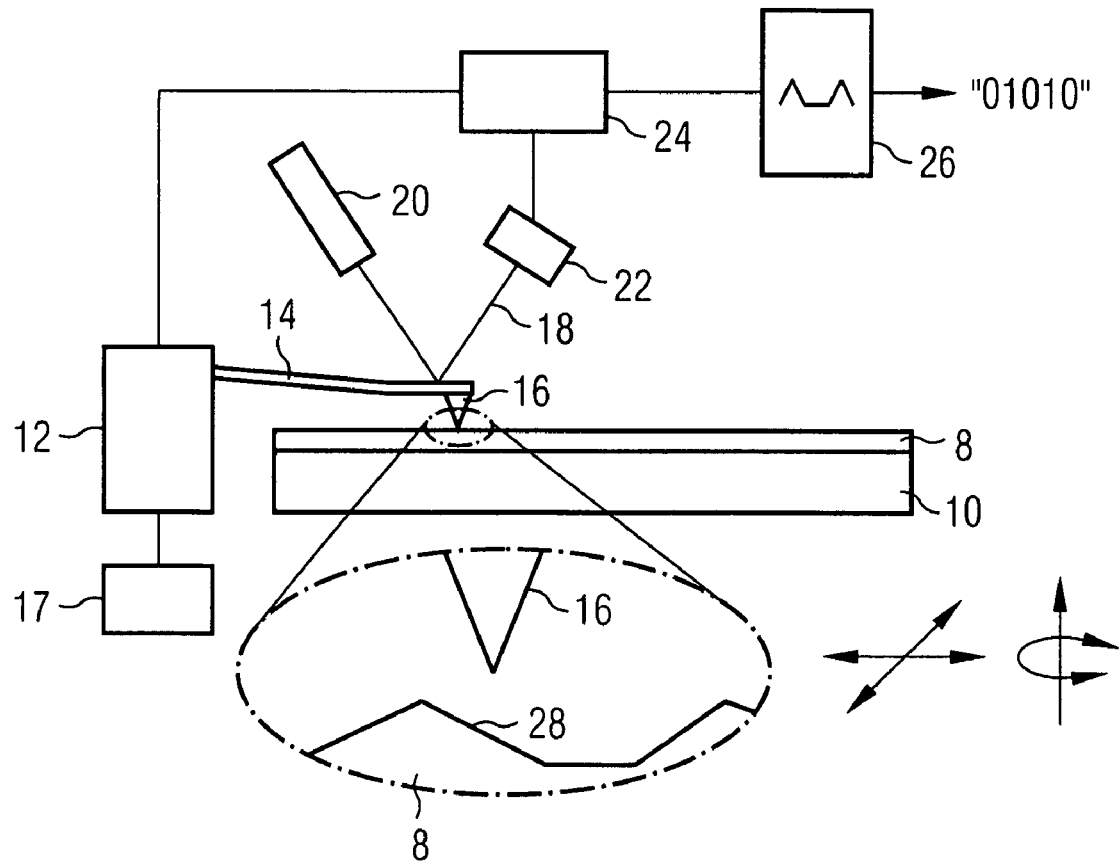

EBD-tip, same scan line

METHOD AND APPARATUS FOR STORING AND READING INFORMATION IN A FERROELECTRIC MATERIAL

CLAIM FOR PRIORITY

This application is a continuation of PCT/EP03/07650, filed Jul. 15, 2003 published in the German language on Jan. 22, 2004, which claims the benefit of priority to German Application No. 102 32 386.0, filed Jul. 17, 2002, which is incorporated herein, in its entirety, by reference.

TECHNICAL FIELD OF THE INVENTION

The invention lies in the field of semiconductor technology and relates to a method and apparatus for storing information in a ferroelectric material.

BACKGROUND OF THE INVENTION

Information is stored using a multiplicity of different storage media. One of these storage media is ferroelectric materials, which are characterized by spontaneous polarization. The polarization can be changed by applying an electrical field. This is utilized in the case of ferroelectric storage capacitors, for example. Depending on whether the polarization points in one direction or in the opposite direction, the storage capacitor stores a logic 1 or a logic 0.

Ferroelectric storage capacitors are the subject of intensive development. A prerequisite for the use of ferroelectric storage capacitors is that the ferroelectric layer, including the capacitor electrodes which adjoin this layer, needs to be patterned, however. The storage density which can be achieved using storage capacitors is determined essentially by the smallest structure size F which can be achieved using lithography. Storing one bit normally requires an area of at least $4 F^2$. On a commercial scale, F is currently approximately 120 nm. The storage density which can be achieved as a result is approximately 1.7 Gbit/cm$^2$. On a laboratory scale, on the other hand, "focused ion beam milling" has already been able to be used to achieve a structure size of 70 nm (C. S. Ganpule, "Scaling of ferroelectric and piezoelectric properties in Pt/SrBi$_2$Ta$_2$O$_9$/Pt thin films", Appl. Phys. Lett. 75 (1999), 3874-3876). A significantly higher storage density is desired, however.

To this end, a large number of examinations were started to store information in a ferroelectric material in another way. Thus, U.S. Pat. No. 6,064,587, for example, proposes the use of a conductive tip to which an electrical potential is applied and which is passed over the surface of a ferroelectric material and modifies the polarization of individual domains of the ferroelectric material. To read the stored information, methods based on various physical principles are proposed. In one of these methods, the deflection of a nonconductive piezoelectric tip which has been placed close to the individual domains is evaluated. A further option proposed is the utilization of the electrooptical effect, which involves the change in the polarization of light being recorded by means of a near-field optical system. Finally, the use of nonlinear optical effects (for example Kerr effect, second harmonic generation and two or four wave mixing) is also proposed.

In U.S. Pat. No. 5,835,477, the polarization in the ferroelectric material is changed using an AFM tip which has been placed close to the ferroelectric material and to which a voltage is applied, and the information written in this manner is read by measuring a tunnel current between the AFM tip and the ferroelectric material.

Electrical writing using an AFM tip is also described by C. H. Ahn et al., "Local, Nonvolatile Electronic Writing of Epitaxial Pb(Zr$_{0.52}$Ti$_{0.48}$)O$_3$/SrRuO$_3$ heterostructures", Science, Vol. 276 (1997), 1100-1103.

A drawback of this practice is that during reading an electrical field acts on the ferroelectric material and this results in the risk of alteration of the stored information in this domain and adjoining domains. Certain "nondestructive reading" is not assured.

When the information is written into the ferroelectric material using an electrical field, there is likewise the risk that scattering of the electrical field will likewise change the polarization of neighboring domains. Individual domains therefore cannot be actuated with sufficient isolation.

A further basic option for storing information using ferroelectric layers may be seen in the use of ferroelectric field effect transistors (S. Mathews et al., "Ferroelectric Field Effect Transistor Based on Epitaxial Perovskite Heterostructures", Science, 276 (1997), 238-240).

SUMMARY OF THE INVENTION

The present invention discloses a method and apparatus for storing information in a ferroelectric material where individual domains are assured of being addressed with certainty.

In one embodiment of the invention, there is a method for storing information in a ferroelectric material, including:
 a ferroelectric material having a surface is provided; and
 a sample probe is passed over the surface of the ferroelectric material and is brought close enough to the surface of the ferroelectric material for it to have a mechanical action on the ferroelectric material and therefore to bring about a change of polarization in individual regions in order to store information.

Individual regions of the ferroelectric material are accordingly switched mechanically, i.e. their polarization is altered through mechanical action, or even a reverse of polarization is brought about. Piezoelectric data stores can thus be formed. Since the contact area of the tip of the sample probe can be kept particularly small (for example the radius of the contact area may be in the order of magnitude of single domains) with the ferroelectric material, particularly when using tips which are typically used for AFM microscopes, immediately neighboring domains may also be reversibly switched largely independently of one another. The contact area of the sample tip therefore needs to be in the order of magnitude of the region which is to be switched. When individual domains are switched, the contact area should have a radius of approximately 5 nm, for example.

The present invention therefore makes use of the activation of ferroelectric layers described in the specialist article by C. E. Zybill, "The mechanism of polarization inscription into ferroelectric (111) PZT and (100) SBT films", Material Science and Engineering C 18 (2001), 191-198, in order to store information.

Stray electrical fields do not arise with this type of information storage.

It does not matter in this context whether the tip of the sample probe acts on the surface of the ferroelectric material in contact mode or in tapping mode. Contact mode is understood to mean the region of interaction between the ferroelectric material and the tip of the sample probe, which region is characterized by repulsive forces, i.e. the tip of the sample probe is passed close enough to the surface of the ferroelectric material for repulsive forces to obtain between the tip and the ferroelectric material. In tapping mode, on the other hand, the tip oscillates, touching the surface of the ferroelectric material only for a very small fraction of the oscillation period within the context of contact mode. By contrast, in noncontact mode, the tip is in the region of attractive intermolecular forces.

Tapping mode is particularly favorable, since the oscillation significantly reduces lateral forces acting on the tip, and hence the accuracy of the addressing of individual regions and particularly of individual domains is significantly increased.

The ferroelectric material preferably has a spinel or perovskite crystal structure or a crystal structure which is related to these. Examples of such materials are PZT (lead zirconium titanate) and SBT (strontium bismuth tantalate), these materials being able to be in doped and undoped form. By way of example, PZT may be doped with lanthanum.

A further advantage may be seen in that it is possible to dispense with patterning the ferroelectric material or the top and bottom capacitor electrodes in order to form storage capacitors.

By addressing the individual regions, which are preferably formed by individual crystallites (for example 200 nm diameter) or even by individual domains (for example 15 nm width), it is possible to produce data stores with storage densities of up to 200 Gbit inch$^{-2}$. Information is stored in nonvolatile fashion in this case.

Although it is known that individual domains can be revealed using the "piezoresponse method" (for example G. D. Hu et al., "Domain imaging and local piezoelectric properties of the (200)-predominant SrBi$_2$Ta$_2$O$_9$ thin films", Appl. Phys. Lett. 75 (1999), 1610-1612; A. Gruverman et al., "Nanoscopic switching behavior of epitaxial SrBi$_2$Ta$_2$O$_9$ films deposited by pulsed laser deposition", Appl, Phys. Lett. 76 (2000), 106-108; A. Gruverman & Y. Ikeda, "Characterization and Control of Domain Structure in SrBi$_2$Ta$_2$O$_9$ Thin Films by Scanning Force Microscopy", Jpn. J. Appl. Phys. 37 (1998), L939-L941), all domains are activated collectively and not individually and selectively by this method.

With particular preference, the ferroelectric material is arranged on at least one electrode which has a bias applied to it at least during the storage of information. The bias forms a potential well which stabilizes the stored polarization. This contributes to certain storage of information. Preferably, the bias is greater than 0 volt and is between 0 and 10 volts, for example. The bias should advantageously be applied continuously, i.e. for the whole of the storage time.

It is also preferred when the ferroelectric material covers a plurality of electrodes, with each electrode defining a block of individual regions of the ferroelectric material, and the information being stored in blocks. By way of example, an entire block's information which is to be stored can first be written to a buffer store and then transferred to the appropriate block. Preferably, the information included in the respective block is erased before the information is transferred to the ferroelectric material. This is preferably done by removing the bias from this block, as a result of which the potential well disappears and the individual regions of the ferroelectric layer of this block relax their original polarization, i.e. adopt a disorderly polarization again.

The use of the bias ensures permanent storage of information particularly where the individual regions of the ferroelectric material would relax their original polarization without continuous mechanical action. In addition, it is a particularly simple matter to erase the stored information. The size of the electrodes defines the number of individual regions which a block comprises and may be chosen arbitrarily in practice.

In another embodiment of the invention, there is a method for reading information which has been stored in a ferroelectric material.

In line with the invention, this method includes:

a ferroelectric material having a surface is provided, whose surface has a relief which represents stored information; and a sample probe passed over the surface of the ferroelectric material is used to determine the relief of the surface of the ferroelectric material, from which the information stored in the relief is derived.

In line with the invention, the information which is stored in the ferroelectric material and which is found in the relief of the ferroelectric material is read by scanning the relief. Accordingly, topographical measurement is used to obtain information. The local resolution which can be achieved thereby, and which ranges down to the region of a few and even down to below 1 nm, is approximately two orders of magnitude greater than in the case of measurements of the surface potential, as is done in U.S. Pat. Nos. 5,835,477 and 6,064,587, for example.

In this case, the topography (relief) is determined by the polarization (direction and magnitude) of individual regions or domains, i.e. the information may be seen in the polarization and in the accompanying change in the topography (relief).

In principle, it does not matter how the information was written into the ferroelectric material. Preferably, however, it is done by means of mechanical action on individual domains. In this case, the entire process of storing and ascertaining information is based on mechanical interaction between the sample probe, or its tip, and the ferroelectric material.

Alternative options for storing information in a ferroelectric material include, by way of example, optical activation through collective switching of the polarization by means of irradiation into the "softmode phonon frequency" of the phase transition on a paraelectric/ferroelectric basis (for example 600 cm$^{-1}$). The radiation used for this purpose is in the UV range (e.g. an He/Cd laser or excimer laser) whose wavelength has been chosen such that E>E$_{bandgap}$ of the ferroelectric material. Particularly after doping of the ferroelectric material with rare-earth compounds, optical activation of individual domains is possible. To improve the local resolution, the use of a near-field optical system is recommended. A suitable material in this case is lanthanum-doped PZT.

A further alternative option involves magnetic activation by varying the composition of the ferroelectric material (incorporation of magnetic atoms) or by constructing "superlattices" with functional,. e.g. magnetic or supraconductive layers. In such layers, it is possible to achieve, by way of example, an induced reversal of polarization (coupled to a change of magnetic field) in the ferroelectric material. This can likewise be performed by domain. This storage of information is based on the Kerr effect, for example.

Another possibility is the electrical activation of individual regions (crystallites or domains) by metalized metal tips to which an electrical voltage has been applied.

The invention also relates to an apparatus for storing and reading information in a ferroelectric material. Such apparatuses are known from the aforementioned U.S. Pat. Nos. 5,835,477 and 6,064,587, for example.

In another embodiment of the invention, there is an apparatus for storing and reading information in a ferroelectric material has the following features in line with the invention:

a ferroelectric material having a surface, at least one sample probe for writing information into the ferroelectric material, which can be passed over the surface of the ferroelectric material, at least one sample probe for reading information from the ferroelectric material, which can be passed over the surface of the ferroelectric material, a relief of the surface of the ferroelectric material being able to be created in order to read the information, and an evaluation unit which derives the stored information from the relief of the surface of the ferroelectric material.

The sample probes for reading and storing the information may be formed by a joint sample probe or by separate sample probes. In the simplest case, the inventive apparatus accordingly comprises at least one sample probe both for writing and for reading the information. The use of separate sample probes for writing and reading information allows storage and reading in parallel in comparison with the use of a single sample probe.

To store information, the sample probe has a mechanical action on the surface of the ferroelectric material and therefore results in a change of polarization or a reversal of polarization in individual regions or individual domains which is expressed in modification of the relief of the ferroelectric material. The relief modified in this manner is scanned by the sample probe in order to read the information, and the stored information is obtained from the scanned relief. This is done using the evaluation unit.

The sample probe's tip interacting with the surface of the ferroelectric material is preferably plasma-sharpened silicon tips (SSS), carbon tips deposited in the electrode beam (EBD) or "carbon nanotubes" (CNT). Carbon nanotubes can preferably be deposited using a CVD method and preferably have a diameter of a few nanometers.

With particular preference, the ferroelectric material covers at least one electrode which can have a bias applied to it in order to stabilize the mechanically induced reversal/change of polarization. In addition, the stored information can easily be erased by removing the bias.

It is also preferred when the ferroelectric material covers a plurality of electrodes, with each electrode defining a block of individual regions of the ferroelectric material, and the individual electrodes each being able to have a bias applied to them independently of one another. The individual blocks can therefore both have information written to them and be erased independently of one another.

The invention can accordingly also be summarized as follows:

To store information in a ferroelectric material, a sample probe is used to bring about mechanical action on individual regions/domains and thereby to cause a change/reversal of polarization in the individual regions/domains, with electrodes situated below the ferroelectric material being able to have a bias applied to them in order to stabilize the change/reversal of polarization. The change/reversal of polarization causes an alteration in the surface topography (relief) of the ferroelectric material, and this alteration can be used to read the information. The stored information is therefore obtained by ascertaining the surface topography of the ferroelectric material. The information is written and read using an AFM tip, with the tip being able to be operated in contact or tapping mode for writing, and additionally in noncontact mode for reading.

BRIEF DESCRIPTION OF THE DRAWINGS

The invention is described below with reference to exemplary embodiments and is illustrated in figures, in which:

FIG. 1 shows a basic outline of the mechanical activation.

FIG. 2 shows an inventive apparatus for storing and reading.

FIG. 3b shows a linear scan along the line shown in FIG. 3a.

DETAILED DESCRIPTION OF THE INVENTION

Figure 3A:
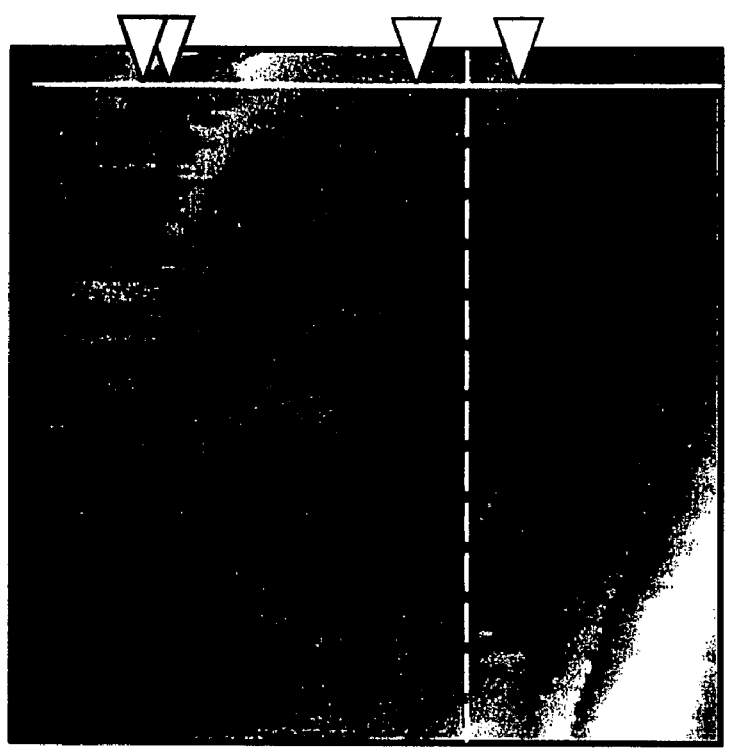
FIG. 3a shows the two-dimensional representation of a ferroelectric material's relief scanned using an AFM tip.

FIG. 1 shows a ferroelectric material 2 which has a plurality of domains 4a-4d. Arrows indicate the direction of the polarization of the individual domains. A sample probe 6 is used to exert a force on the domain 4b and therefore to bring about a reversal of polarization in this domain.

The framework of the balanced domain structure is determined essentially during production of the ferroelectric material and particularly during the crystallization. In the case of polycrystalline ferroelectric material, as is normally used, the ferroelectric material comprises a large number of small crystallites (frequently also referred to as grains) with a different orientation in the crystal structure. Spontaneous polarization occurs when the individual crystallites are formed. Areas within individual crystallites having the same polarization are referred to as domains in this context. It is possible for a single domain to form in a crystallite. On the other hand, the formation of a plurality of domains within a crystallite is also observed. The larger the crystallites, the higher the likelihood of multiple domains. Further details in this regard can be found, inter alia, in Q. D Jiang et al., "Nucleation and surface morphology evolution of ferroelectric $SrBi_2Ta_2O_9$ films studied by atomic force microscopy", Surface Science 405 (1998), L554-560; C. E. Zybill et al., "Substrate Influence on the Domain Structure of (111) PZT $PbTi_{0.75}Zr_{0.25}O_3$ Films", phys. stat. sol (a) 1777 (2000), 303-309; and A. E. Romanov et al., "Domain Patterns in (111) Oriented Tetragonal Ferroelectric Films", phys. stat. sol (a) 172 (1999), 225-253, the content of whose disclosure is incorporated in full herewith.

Domains which have a positive polarization component perpendicular to the surface of the ferroelectric material can have their polarization reversed by 180° both in tapping mode and in contact mode by means of pulse transmission. Suitable measures during the production of the ferroelectric material allow the polarization axes of the individual domains to be oriented essentially perpendicular to the surface. This can be achieved during the crystallization, for example, under the action of an electrical field.

The piezoelectric effect of the ferroelectric material means that the reversal of polarization is associated with a significant change in the surface topography. For this reason, subsequent ascertainment of the surface topography allows the stored information to be read.

In contact mode, hysteresis curves for the switching effects of approximately 1 nm swing and approximately 5 nN force for switching a domain of approximately 17 nm width are observed. The measurements were performed on a film of approximately 700 nm thickness on (111) oriented PZT of composition $PbTi_{0.75}Zr_{0.25}$. The PZT was sputtered onto commercial platinum electrodes on oxidized (100) silicon wafers. This can be done in line with the method published in the specialist article by R. Bruchhaus et al., Integrated Ferroelectrics 14 (1997), 141, for example.

The ferroelectric material 2 covers a plurality of electrodes 30a and 30b. The extent of the individual electrodes 30a and 30b is greater than the extent of individual regions for switching 4a, 4b, 4c and 4d, which means that each electrode 30a and 30b combines a plurality of individual regions 4a, 4b, 4c and 4d to form individual blocks 40a and 40b. Each block 40a and 40b can have a bias $U_a$ and $U_b$ applied to it independently of the other blocks. Applying the biases, which may be between 0 and 10 volts, stabilizes the mechanically written polarization. The bias is accordingly chosen to be high enough for a sufficiently deep potential well to form which stabilizes the written polarization. On the other hand, the written polarization and hence the written information can easily be erased by removing the bias.

FIG. 2 shows an inventive apparatus for storing and reading information. The information is written into a ferroelectric layer 8 which is arranged on a substrate 10. An AFM cantilever 14 mounted on a scan unit 12 has its tip 16 passed over the surface of the ferroelectric layer 8. In this case, the position of the scan unit 12, particularly in the z direction perpendicular to the surface of the ferroelectric layer 8, is normally determined by a voltage $U_{scanner}$ which is applied to piezoelectric actuating elements. As the position of the scan unit changes, the cantilever is moved at the same time. The deflection of the cantilever 14, which is dependent on the interaction with the surface of the ferroelectric layer, is ascertained by means of a laser beam 18 reflected on the reverse of the cantilever 14. To this end, a laser beam emitted by a laser 20 is directed onto the cantilever 14. The light which the latter reflects is recorded by a 2 or 4 field sensor 22. Depending on the illumination of the fields of the sensor 22, it is possible to infer the deflection of the cantilever 14. A feedback control loop 24 alters the position of the cantilever such that it is free of deflection.

To store information, the cantilever 14 has its tip 16 pressed against the surface of the ferroelectric layer 8 such that a reversal of polarization in individual domains arises. The requisite force can be ascertained from the deflection in the knowledge of the spring constant of the cantilever and of the contact area between the tip and the ferroelectric layer. The contact area between the tip 16 and the ferroelectric layer 8 should be small enough to be able to switch single domains. By way of example, a contact area having a radius of 5 nm is suitable. The tip 16 may be either plasma-sharpened silicon tips or carbon tips deposited in the electrode beam. The tip 16 may be passed over the surface of the ferroelectric layer 8 both in contact mode and in tapping mode in this case.

The information to be stored is read from a buffer store 17 and is written into the ferroelectric layer 8 in blocks. To this end, the bias on the electrode in the corresponding block is first removed, which means that the individual regions of the ferroelectric layer can relax. The information is then written by applying the bias.

Depending on the need, the surface of the ferroelectric layer 8 can be scanned by making a scan movement by the tip relative to the ferroelectric layer in the x and y directions or by rotating the ferroelectric layer and scanning different radii. The latter option is known from the hard disks in a computer, for example. Besides contact mode and tapping mode, noncontact mode is also possible for reading.

To read the stored information, the tip 16 is used to scan the surface of the ferroelectric layer 8, and the surface topography or the relief 28 of the surface is ascertained. The data obtained in this process are supplied to an evaluation unit 26 which is used to extract the stored information from the relief 28.

Figure 3B:
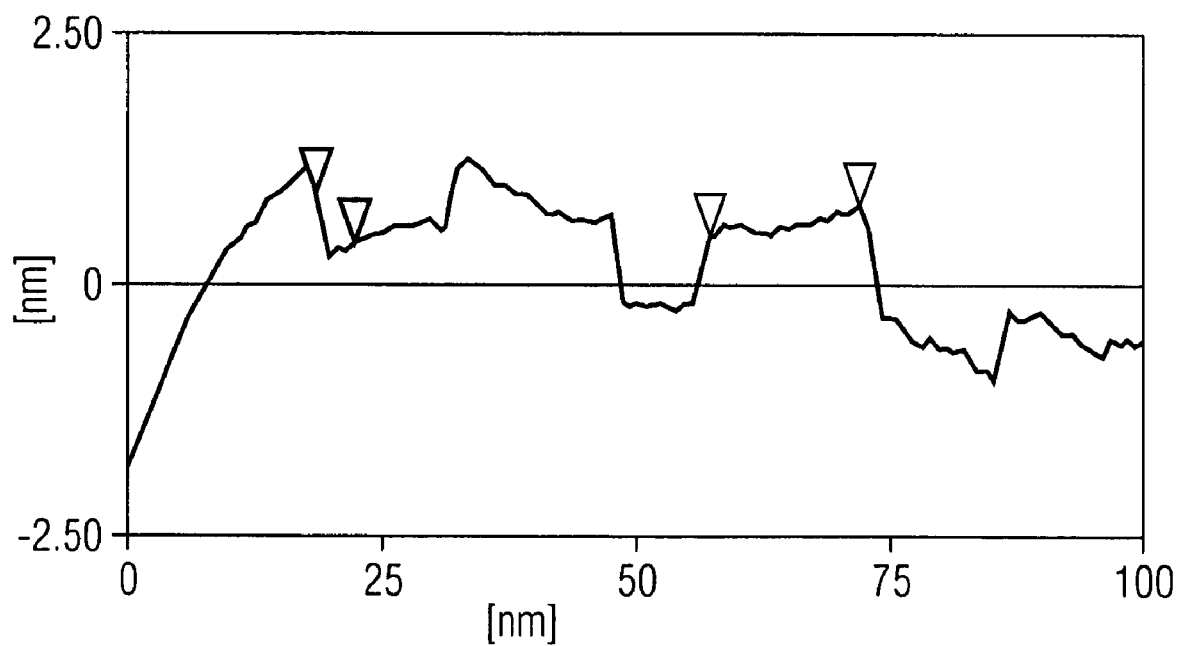

A two-dimensional relief of this type is shown by way of example in FIG. 3a. By contrast, FIG. 3b shows the relief along the line indicated in FIG. 3a.

The relief has been ascertained using an EBD tip with a contact area radius of 5 nm on a surface of a (111) PZT layer. The relief in FIG. 3a clearly shows the activation, i.e. the reversal of polarization through 180°, of every second domain.

Figure 4:
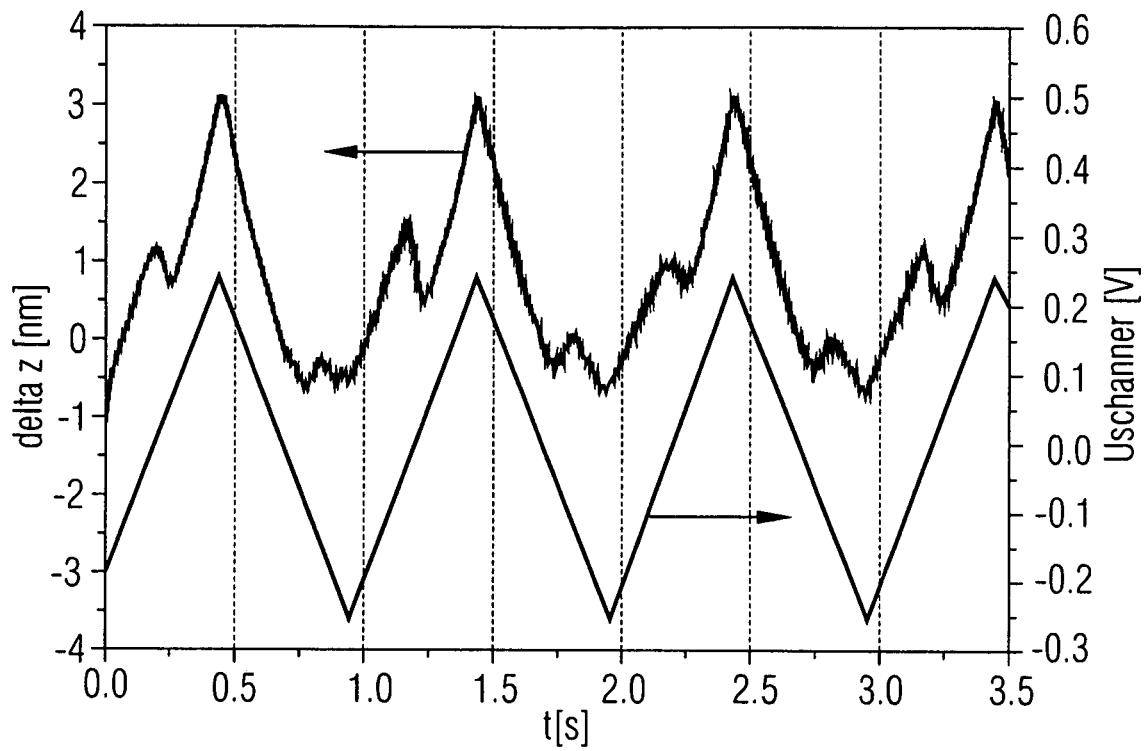
FIG. 4 shows the measurement of the deflection of the sample probe.

In FIG. 4, the bottom curve shows the scanner amplitude, i.e. the position of the scan unit 12, and the top curve shows the response of the PZT domain, i.e. the deflection of the AFM tip. The response essentially follows the excitement, i.e. the mechanical activation, but in the rising branch jumps into the other direction of polarization at approximately $U_{scanner}=0.04$ V, and returns to the original position in the falling branch at approximately $U_{scanner}=0.1$ V. An EBD tip was operated in contact mode on a domain of a (111) PZT layer.

Figure 5:
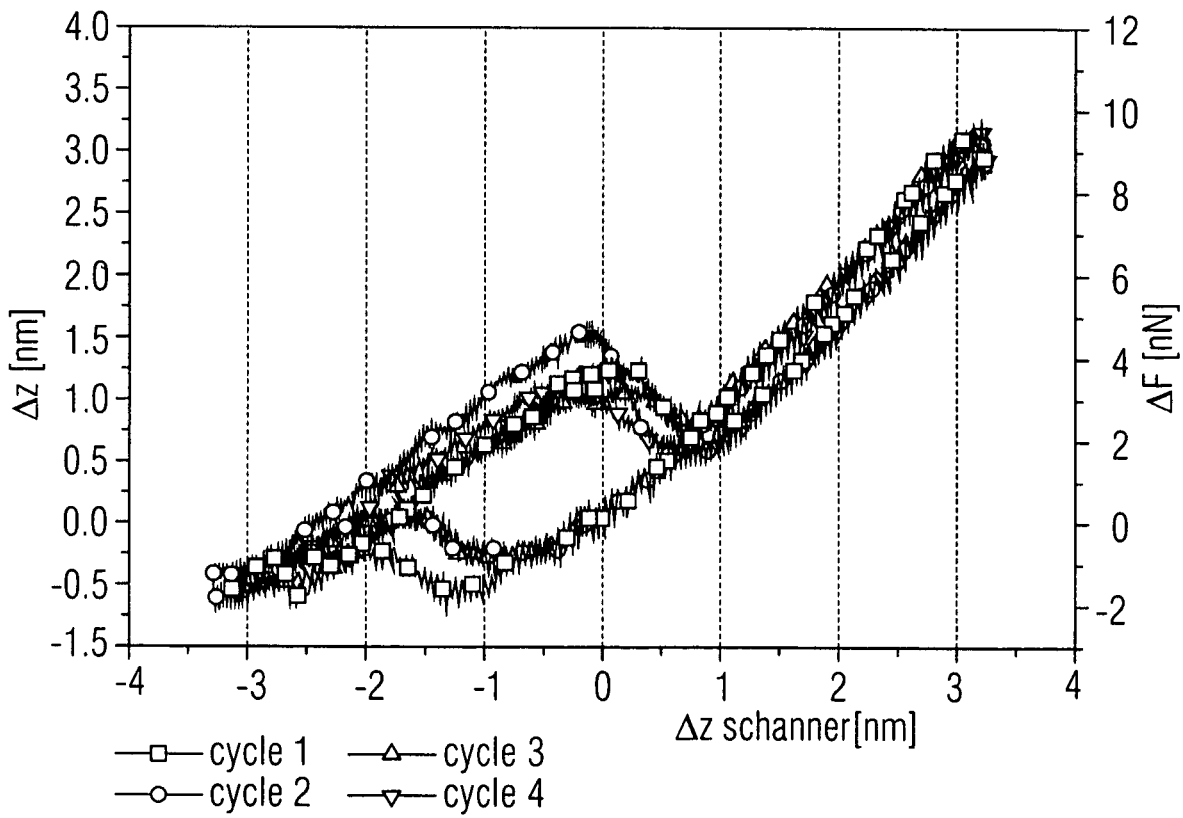
FIG. 5 shows the measurement of four cycles of the deflection of the sample probe.

By contrast, FIG. 5 shows the deflection of the cantilever (converted into $\Delta F$) as a function of the scanner amplitude (converted into $\Delta z_{scanner}$) for the four cycles from FIG. 4. The swing in a domain is approximately 1 nm, with the reversal of polarization in a domain requiring approximately 5 nN. The hysteresis curve formed is clearly discernible.

What is claimed is:

1. A method for storing information in a ferroelectric material, comprising:
   providing a ferroelectric material having a surface, the ferroelectric material arranged on at least one electrode, and the electrode having a bias applied thereto continuously at least during storage of information; and
   passing a sample probe over the surface of the ferroelectric material, within a distance of the surface of the ferroelectric material to perform a mechanical action on the ferroelectric material, to cause a change of polarization in individual regions of the ferroelectric material to store information.

2. The method as claimed in claim 1, wherein the ferroelectric material has individual domains which represent the individual regions, the change of polarization in the individual domains being effected by the sample probe.

3. The method as claimed in claim 1, wherein the mechanical action is performed by a tip of the sample probe.

4. The method as claimed in claim 3, wherein the tip acts on the surface of the ferroelectric material in contact mode or tapping mode.

5. The method as claimed in claim 1, wherein the ferroelectric material has a perovskite, spinel or related crystal structure.

6. The method as claimed in claim 5, wherein the ferroelectric material is doped or undoped SBT or PZT layers.

7. The method as claimed in claim 1, wherein the ferroelectric material covers a plurality of electrodes, with each electrode defining a block of individual regions of the ferroelectric material, and the information being stored in blocks.

8. The method as claimed in claim 1 wherein the stored information is erased by removing the bias from the at least one electrode.

9. The method as claimed in claim 8, wherein prior to the storage of information the stored information is erased.

10. The method as claimed in claim 9, wherein the stored information is erased in blocks.

11. A method for reading information which has been stored in a ferroelectric material, comprising:
providing an apparatus that comprises the ferroelectric material having a surface with a relief which represents stored information, at least one sample probe for writing information into the ferroelectric material and configured to be passed over the surface of the ferroelectric material, the sample probe for writing information configured to perform a change of polarization in individual regions of the ferroelectric material mechanically to write the information, and at least one sample probe for reading information from the ferroelectric material;
passing the sample probe for reading information over the surface of the ferroelectric material to determine the relief of the surface of the ferroelectric material; and
deriving the stored information from the relief of the surface of the ferroelectric material.

12. The method as claimed in claim 11, wherein the relief of the surface of the ferroelectric material is determined by the polarization of individual regions of the ferroelectric material.

13. The method as claimed in claim 11, wherein the relief of the surface of the ferroelectric material is determined by a tip of the sample probe.

14. The method as claimed in claim 13, wherein the tip is passed over the surface of the ferroelectric material in tapping mode, contact mode or noncontact mode to determine the relief of the ferroelectric material.

15. The method as claimed in claim 11, wherein the tip of the sample probe is an AFM tip.

16. The method as claimed in claim 15, wherein the AFM tip is a plasma-sharpened silicon tip, a carbon tip deposited in the electrode beam or a carbon nanotube tip.

17. An apparatus for storing and reading information in a ferroelectric material, comprising:
a ferroelectric material having a surface, the ferroelectric material covering at least one electrode which has a bias applied thereto;
at least one sample probe for writing information into the ferroelectric material, configured to be passed over the surface of the ferroelectric material, the sample probe used to perform a change of polarization in individual regions of the ferroelectric material mechanically to write the information;
at least one sample probe for reading information from the ferroelectric material, configured to be passed over the surface of the ferroelectric material, a relief of the surface of the ferroelectric material created to read the information; and
an evaluation unit which derives the stored information from the relief of the surface of the ferroelectric material.

18. The apparatus as claimed in claim 17, wherein the sample probe has a plasma-sharpened silicon tip, a carbon tip deposited in the electrode beam or a carbon nanotip which is used to write and/or read the information.

19. The apparatus as claimed in claim 17, wherein the ferroelectric material has a perovskite, spinel or related crystal structure.

20. The apparatus as claimed in claim 19, wherein the ferroelectric material is doped or undoped SBT or PZT layers.

21. The apparatus as claimed in claim 17, wherein the ferroelectric material covers a plurality of electrodes, with each electrode defining a block of individual regions of the ferroelectric material, and the individual electrodes each having a bias applied to them independently of one another.

* * * * *